US00RE40541E

(19) United States
(12) Reissued Patent
Korhonen

(10) Patent Number: US RE40,541 E
(45) Date of Reissued Patent: Oct. 14, 2008

(54) METHOD AND SYSTEM FOR TESTING A UNIVERSAL SERIAL BUS WITHIN A COMPUTING DEVICE

(75) Inventor: Aki Korhonen, Reno, NV (US)

(73) Assignee: PC-Doctor, Inc., Reno, NV (US)

(21) Appl. No.: 11/600,688

(22) Filed: Nov. 15, 2006

Related U.S. Patent Documents

Reissue of:
(64) Patent No.: 6,829,726
Issued: Dec. 7, 2004
Appl. No.: 09/800,763
Filed: Mar. 6, 2001

U.S. Applications:
(60) Provisional application No. 60/187,317, filed on Mar. 6, 2000.

(51) Int. Cl.
*G06F 11/00* (2006.01)

(52) U.S. Cl. ..... 714/25; 710/5
(58) Field of Classification Search ..... 714/25, 714/27, 31, 4, 3, 56, 43; 710/5
See application file for complete search history.

(56) References Cited

U.S. PATENT DOCUMENTS

| | | | | |
|---|---|---|---|---|
| 5,859,993 | A | 1/1999 | Snyder | 712/208 |
| 6,311,294 | B1 | 10/2001 | Larky et al. | 714/44 |
| 6,343,260 | B1 | 1/2002 | Chew | 702/122 |
| 6,389,560 | B1 | 5/2002 | Chew | 714/43 |
| 6,393,588 | B1 | 5/2002 | Hsu et al. | 714/43 |
| 6,480,801 | B2 | 11/2002 | Chew | 702/122 |
| 6,577,979 | B1 | 6/2003 | Okitaka | 702/117 |
| 6,605,966 | B1 | 8/2003 | Chen et al. | 327/76 |
| 6,701,401 | B1 | 3/2004 | Lu et al. | 710/305 |
| 6,732,301 | B1 | 5/2004 | Landry et al. | 714/43 |

OTHER PUBLICATIONS

Archive of "Diagnostics Hardware and Software for PCT testing and repair—Ultra–X. . ."www.uxd.com, [online][Archived by http://archive.org on Jun. 20, 2000; Retrieved on Mar. 23, 2006] Retrieved from the Internet<URL:http://web.archive.org/web/20000620000644/http://www.uxd.com>.

Archive of "Diagnostics Hardware and Software for PCT testing and repair—Ultra–X. . ." www.uxd.com, [online] [Archived by http://archive.org on Jun. 20, 2000; Retrieved on Jul. 5, 2006] Retrieved from the Internet<URL:http://web.archive.org/web/20000620000644/http://www.uxd.com>.

(Continued)

*Primary Examiner*—Nadeem Iqbal
(74) *Attorney, Agent, or Firm*—Fenwick & West LLP

(57) ABSTRACT

The present invention generally relates to the field of testing computing devices. More specifically, the present invention relates to a system and method for testing a universal serial bus ("USB") within a computing device. In an exemplary embodiment, the system includes a test device and a test control module. The test device is connected to a USB port on the computing device. The test control module resides on the computing device and interacts with the test device to test the USB port. Once connected, the test device is used to monitor signals on the USB port exchanged between the test device and the USB port. Examples of signals that are monitored are the voltage levels, frame timing, and USB bus signals and power voltages. The test device then communicates the monitored information to the test control module for analysis. The test control module is further capable of causing a second set of tests to be performed including a full-speed device detect test, a bulk transfer test, an isochronous transfer test, an interrupt transfer test, and a low-speed device detect test. The results of these tests are then communicated to the user.

27 Claims, 2 Drawing Sheets

OTHER PUBLICATIONS

Archive of "Hardware Diagnostic Tools—Ultra–X, Inc.," www.uxd.com/hproducts. . ., [online] [Archived by http://archive.org on Aug. 17, 2000; Retrieved on Mar. 23, 2006] Retrieved from the Internet<URL:http://web.archive.org/web/20000817115611/www.uxd.com/hproducts. . .>.

Archive of "* New Release* —Quick Tech USB Tester," www.uxd.com/qtu... , [online] [Archived by http://archive.org on Jan. 7, 2001; Retrieved Mar. 23, 2006] Retrieved from the Internet<URL:http://web.archive.org/web/20010107145600/http://www.uxd.com/qtu...>.

Archive of "Sycard Technology," www,sycard.com, [online] [Archived by http://archive.org on Jun. 14, 1998; Retrieved on Jul. 27, 2006] Retrieved from the Internet<URL:http://web.archive.org/web/19980614222343/http://www.sycard.com/>.

Archive of "TradeShows—Ultra–X, Inc.," www.uxd.com/tradeshowshtml [online] [Archived by http://archive.org on Nov. 21, 2000; retrieved on Jul. 5, 2006] Retrieved from the Internet<URL:http://web.archive.org/web/20001121033900/uxd.com/tradeshows.html>.

Archive of "Universal Serial Bus Debugger—USB-debug700," www.sycard,com/usbdebug.html, [online] [Archived by http://archive.org on Jun. 14, 1998; Retrieved on Jul. 27, 2006] Retrieved from the Internet<http://web.archive.org/web/19980614222531/www.sycard.com/usbdebug.html>.

Archive of "Universal Serial Bus Debugger—USB-debug700," www.sycard.com/usbdebug.html, [online] [Archived by http://archive.org on Dec. 7, 1998; Retrieved on Jul. 27, 2006] Retrieved from the Internet<URL:http://web.archive.org/web/19981207005128/www.sycard.com/usbdebug.html>.

Archive of "Universal Serial Bus Port Tester—USBtest 2000," www.scycard.com/usbtest.html, [online] [Archived by http://archive.org on Dec. 6, 1998; Retrieved on Jul. 27, 2006] Retrieved from the Internet<URL:http://web.archive.org/web/19981206073754/www.sycard.com/usbtest.html>.

Archive of "www.sycard.com," www.sycard.com/index.html, [online] [Archived by http://archive.org on Dec. 5, 1998; Retrieved on Jul. 27, 2006] Retrieved from the Internet<URL:http://web.archive.org/web.archive.org/web/19981205191905/http://www.sycard.com/index.html>.

"CATC Announces Industry's First Production Test Tool for USB Hubs," LeCroy Corporation, 2006, [online] [retrieved on Jul. 27, 2006] Retrieved from the Internet<URL:http://www.lecroy.com/Product/Press/CATC__Archive/012400__UPT.asp?news__id=607&menuid=40>.

"CATC Announces Industry's First Production Test Tool for USB Hubs," Jan. 24, 2000, 2 pages.

"CATC Introduces The First USB/Ethernet Link," Aug. 16, 1999, 3 pages.

"CATC™ UPT™ Universal USB Port Tester User's Manual," Computer Access Technology Corporation, Sep. 22, 2000, 46 pages.

"Comdex Guide Program & Exhibits Guide," Fall 2000, Nov. 13–17, 2000, 2 pages.

Computer Service & Support, Sep./Oct. 2000, pp. 32–33.

"Dealer Info: Bedrijfsprofielen," Aug. 18, 2000, 1 page.

"Dealer Info: Productnieuws," Aug. 18, 2000, 1 page.

"Dealer Info: VIA–Cyrix: come–back van de budget–CPU," Aug. 18, 2000, 1 page.

Email from Stuart Ting to Anoop Singh (Jun. 9, 2000) re News—New Product Release—QuickTech USB, 2 pages.

Email from Stuart Ting to Anoop Singh (Jul. 13, 2000) re *New Release*—QuickTech USB Port Tester from Ultra–X Inc., 2 pages.

"News—New Product Release—QuickTech USB," Ultra–X, Inc., 2000, [Online] [Retrieved on Jul. 5, 2006] Retrieved from the Internet<URL:http://www.uxd.com/news.html>.

"PC Computer Hardware Diagnostic Tools—Ultra–X, Inc.," Updated Apr. 7, 2001, [online] [retrieved on Mar. 23, 2006] Retrieved from the Internet<URL:http://www.uxd.com/hproducts.htm>.

"Product Brief: USBdebug 700, Universal Serial Bus Monitor," Sycard Technology, 1 page.

"Professional PC Diagnostic Tool Kits," Ultra–X Incorporated, 8 pages.

"Professional PC Diagnostic Tool Kits," UX, 8 pages.

"QuickTech USB–poort tester," Ultra–X Benelux, 1 page.

"QuickTech–USB™ User's Guide," Ultra–X, Inc., 1998–2000, 11 pages.

"Real World Technologies—Ultra–X Quick Tech USB Tester, " Real World Technologies, 1996–2001, [online] [Retrieved on Jun. 29, 2006] Retrieved from the Internet<URL:http://www.realworldtech.com/includes/templates/articles.cfm?ArticleID=RWT013001000000&mode...>.

"Sycard Technology—USB Products," Sycard Technology, Updated Aug. 9, 1999, [online] [Retrieved on Jul. 27, 2006] Retrieved from the Internet<URL:http://www.sycard.com/usb.html>.

"Sycard Technology USBtest 2000 Universal Serial Port Tester," Sycard Technology, Updated Nov. 25, 2002, [online] [Retrieved on Jul. 27, 2006] Retrieved from the Internet<URL:http://www.sycard.com/usbtest.html>.

"2001/Feb Ultra–X marketing Guide," Ultra–X Incorporated, 8 pages.

"Ultra–X Launches QuickTech USB, USB Port and Hub Tester," New Product Releases, Mar. 23, 2006, 2 pages.

"+++USB Diagnosis made easy with QuickTech USB/Ultra–X (UK) Ltd.," Jun. 30, 2000, [online] [Retrieved on Jun. 15, 2006] Retrieved from the Internet<URL:http://computer.prarchive.com/en/pr35298.htm>.

"USB Diagnosis made with easy with QuickTech USB," PRWeb, 1997–2006, [online] [Retrieved Jun. 15, 2006] Retrieved from the Internet<URL:http://www.prweb.com/releases/2006/6/prweb/15937.htm>.

"USBdebug 700 User's Manual," Sycard Technology, Jun. 1998, 8 pages.

"USBdebug 700 User's Manual," Sycard Technology, Jun. 1998, 7 pages.

"Win the race against downtime! Ultra–X Benelux is de importeur van PC Diagnose Tools," Ultra–X Benelux, 1 page.

Answer to Complaint, May 24, 2006, *PC–Doctor, Inc.*v.*Ultra–X, Inc.*(C.D. Cal.) (Case No. CV 06–1729 GAF (Ex)).

Memorandum of Points and Authorities in Support of Ultra–X, Inc.'s Motion for Order Granting Leave to Amend Answer, Nov. 21, 2006, *PC–Doctor, Inc.*v. *Ultra–X, Inc.*(C.D. Cal) (Case No. CV 06–1729 GAF (Ex)).

Plaintiff PC–Doctor, Inc.'s Motion to Stay Proceedings, Nov, 30, 2006, *PC–Doctor, Inc.*v. *Ultra–X, Inc.* (C.D. Cal.) (Case No. CV 06–1729 GAF (Ex)).

Plaintiff PC–Doctor, Inc.'s Opposition to Defendant Ultra–X's Motion for Order Granting Leave to Amend Answer, and Counter Motion to Strike Inequitable Conduct Defense, Jan. 8, 2007, *PC–Doctor, Inc.* v. *Ultra–X, Inc.*(C.D. Cal.) (Case No. CV 06–1729 GAF (Ex)).

Memorandum of Points and Authorities in Opposition to Plaintiff PC–Doctor, Inc.'s Motion to Stay Proceedings, Jan. 8, 2007, *PC–Doctor, Inc.*v. *Ultra–X, Inc.*(C.D. Cal.) (Case No. CV 06–1729 GAF (Ex)).

Plaintiff PC–Doctor, Inc's Counter Motion to Strike Inequitable Conduct Defense, Jan. 8, 2007, *PC–Doctor, Inc.* v. *Ultra X, Inc.*(C.D. Cal.) (Case No. CV 06–1729 GAF (Ex)).

Reply in Support of Plaintiff PC–Doctor, Inc's Motion to Stay Proceedings, Jan. 12, 2007, *PC–Doctor, Inc.*v. *Ultra–X, Inc.*(C.D. Cal.) (Case No. CV 06–1729 GAF (Ex)).

Defendant Ultra–X, Inc.'s Reply to Plaintiff PC–Doctor, Inc.'s Opposition to Motion for Order Granting Leave to Amend Answer and Opposition to Plaintiff's Counter Motion to Strike Inequitable Conduct Defense, Jan. 12, 2007, *PC–Doctor, Inc.* v. *Ultra–X, Inc.*(C.D. Cal.) (Case No. CV 06–1729 GAF (Ex)).

Order Re: Plaintiff's Motion to Stay and Defendant's Motion for Leave to Amend Answer, Jan. 31, 2007, PC–Doctor, Inc. v. Ultra–X, Inc. (C.D. Cal.) (Case No. CV 06–1729 GAF (Ex)).

Declaration of Jonathan A. McMahon in Support of Defendant Ultra–X, Inc.'s Opposition to Plaintiff PC–Doctor, Inc.'s Motion to Stay Proceedings, Jan. 5, 2007, *PC–Doctor, Inc.*v. *Ultra–X, Inc.*(C.D. Cal.) (Case No. CV 06–1729 GAF (Ex)).

Deposition of Carmine Napolitano, Jan. 24, 2007, *PC–Doctor, Inc.* v. *Ultra–X, Inc.*(C.D. Cal.) (Case No. CV 06–1729 GAF (Ex)).

Deposition of Mike Mori, Sep. 18, 2006, *PC–Doctor, Inc.* v. *Ultra–X, Inc.*(C.D. Cal.) (Case No. CV 06–1729 GAF (Ex)).

Plaintiff PC–Doctor, Inc.'s Response to Defendant Ultra–X, Inc's First Set of Requests for Admission, Dec. 4, 2006, *PC–Doctor, Inc.*v. *Ultra–X, Inc.*(C.D. Cal.) (Case No. CV 06–1729 GAF (Ex)).

METHOD AND SYSTEM FOR TESTING A UNIVERSAL SERIAL BUS WITHIN A COMPUTING DEVICE

Matter enclosed in heavy brackets [ ] appears in the original patent but forms no part of this reissue specification; matter printed in italics indicates the additions made by reissue.

CROSS-REFERENCES TO RELATED APPLICATION(S)

The present application claims the benefit of priority under 35 U.S.C. § 119 from the provisional patent application, U.S. patent application Ser. No. 60/187,317, filed on Mar. 6, 2000, which is hereby incorporated by reference as if set forth in full in this document.

BACKGROUND OF THE INVENTION

Universal serial buses (USBs) can be used to connect a wide variety of peripheral devices, such as mice, modems, keyboards, and printers, to an electronic device, such as a personal computer. The use of universal serial buses has become quite widespread. For example, most personal computers now offer a universal serial bus port as one of the standard output options. Possibly, the universal serial bus port could one day completely replace serial and parallel ports.

A USB environment generally includes three parts, namely, a USB host controller which is integrated as part of a computing device, a USB device, and a USB cable which is used to connect the USB device to the USB host controller. More specifically, the USB host controller includes a USB port which receives the USB cable thereby allowing the USB device to communicate with the USB host controller.

Typically, testing of USB centers around the information exchanged between the USB host controller and the USB device. Usually, testing of the communication between the USB device and the USB host controller is done only during the design phase of the computing device containing the USB host controller. For example, USB protocol analyzers, such as a CATC protocol analyzer or a Quality Logic protocol analyzer, are designed for use by designers to verify a USB design. The designers use the protocol analyzers to primarily test the operation of a USB device and to display the data that is exchanged between the USB host controller and the USB device. Some protocol analyzers can also collect a multitude of information, such as voltage levels, speed of operation, and timing signals, from the computing device. Once the information is collected, it is up to the designer to decipher the accuracy and meaning of such information.

In a typical test environment, the computing device, for example, a computer which contains a USB host controller to be tested is connected to an external USB device, such as a printer, via a USB port and a USB cable. The protocol analyzers is then inserted in between the USB host controller and the USB device by using a first USB cable to connect the USB host controller to the protocol analyzer and using a second USB cable to connect the protocol analyzer to the USB device. Basically, these analyzers detect and then capture signals that are sent by the USB host controller via the USB port and USB cable to the USB device, such as a printer. The results of these signals are then interpreted and used by the designer to make any necessary alterations to the design of the USB device and/or USB host controller.

Protocol analyzers when used as a testing device have a number of shortcomings. For example, the information generated by protocol analyzers requires considerable skills to decipher. Moreover, protocol analyzers are generally very cumbersome and bulky. Additionally, they are not economical or feasible for the general public or individual consumer to own. Thus, a person outside of the design environment will generally not have access to a testing device to determine if a USB host controller, a USB cable, and/or a USB port are working properly. Protocol analyzers are not designed for users to test if these features are not working; but rather, for a designer to use in the development of a USB-supported device.

Furthermore, a typical scenario in which a user of a computing device needs to troubleshoot the USB is when a USB device is plugged in and yet not detected by the computing device. The problem may lie with the USB device, the USB cable, the USB port or the USB host controller. Under this type of configuration, troubleshooting of problems usually focuses on excluding failure sources without dismantling all the components of the USB environment.

Hence, it would be desirable to provide a testing device which is capable of testing a USB host controller and USB port within a computing device in a swift and efficient manner.

SUMMARY OF THE INVENTION

The present invention generally relates to the field of testing computing devices. More specifically, the present invention relates to a system and method for testing a universal serial bus ("USB") within a computing device.

A system and method for testing a computing device is provided by virtue of the present invention. In an exemplary embodiment, the system includes a test device and a test control module. The test device is connected to a USB port on the computing device. The test control module resides on the computing device and interacts with the test device to test the USB port. Once connected, the test device is used to monitor signals on the USB port exchanged between the test device and the USB port. Examples of signals that are monitored are the voltage levels, frame timing, and data signals and their voltages. The test device then communicates the monitored information to the test control module for analysis. The test control module is further capable of causing a second set of tests to be performed including a bulk transfer test, an isochronous transfer test, an interrupt transfer test, a full-speed device detect test and a low-speed device detect test. The results of these tests are then communicated to the user.

In another exemplary embodiment, the test device includes a USB port which is capable of receiving a USB cable. One end of the USB cable is connected to the test device while the other end of the USB cable is connected to the USB port. Using this arrangement, the USB cable which is used to connect the test device and the USB port can be tested.

Accordingly, in one embodiment, the present invention provides a system for testing a universal serial bus port of a computing device, including: a test control module residing on the computing device, and a test device coupled to the universal serial bus port, wherein the test control module communicates with the test device in order to perform a series of tests on the universal serial bus host controller, the universal serial bus port and the universal serial bus cable.

Furthermore, in another embodiment, the present invention provides a method for testing a universal serial bus port of a computing device using a test device and a test control module, comprising: connecting said test device to said universal serial bus port using a universal serial bus cable, initializing said test device, causing said test device to provide information for a series of tests in response to instructions received from said test control module, communicating said information to said test control module, and causing said test control module to analyze said information to determine whether said universal serial bus port and cable are functioning properly.

A further understanding of the nature and advantages of the present invention herein may be realized by reference to the remaining portions of the specification and the attached drawings. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
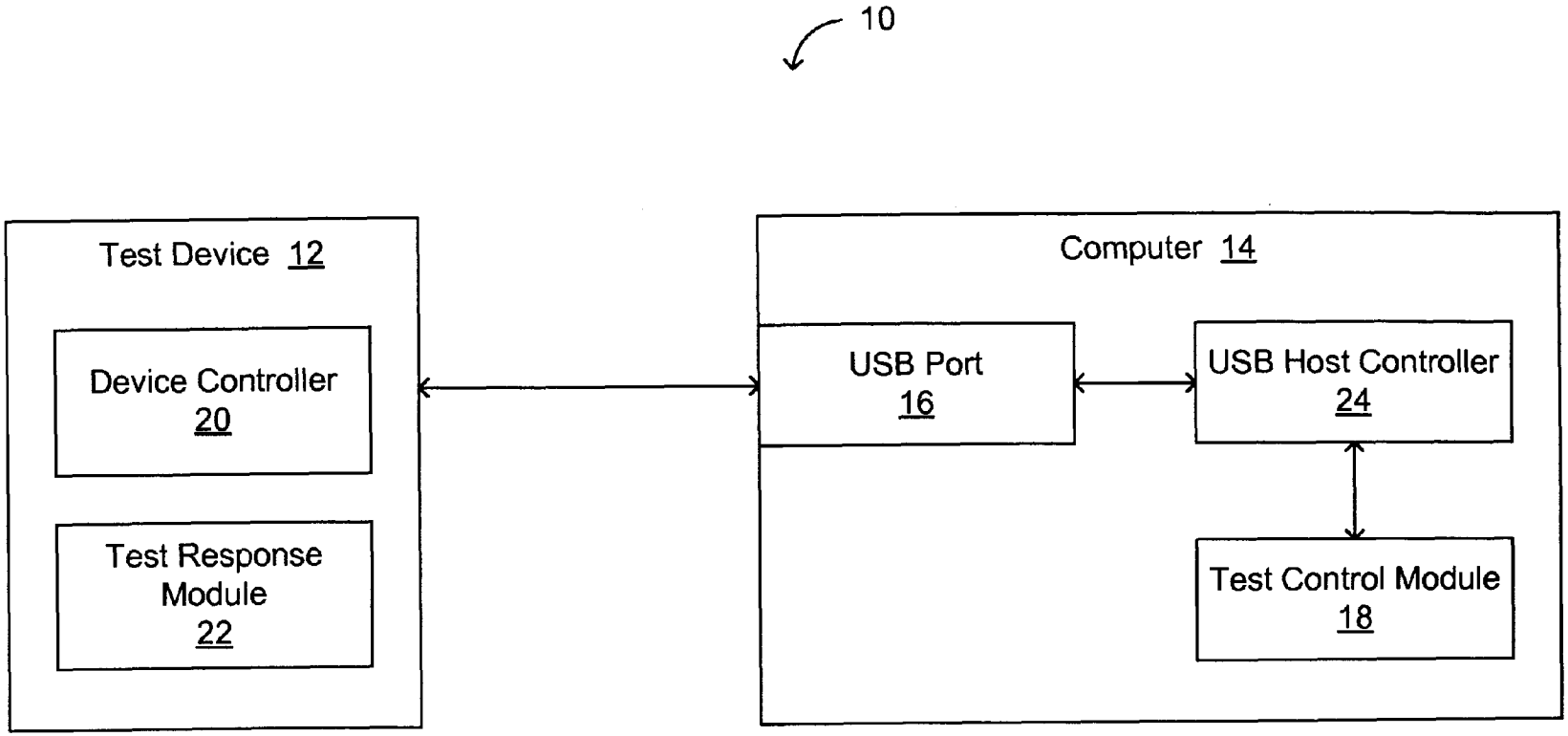
FIG. 1 is a simplified block diagram illustrating an exemplary embodiment of the present invention.

The present invention will now be described. FIG. 1 shows a universal serial bus (USB) testing system 10 that is used to test a USB port 16 of a computing device, such as a computer 14. It should be understood that testing the USB port 16 is meant to include testing a USB host controller 24. The USB host controller 24 is generally integrated as part of the computing device and communicates with the outside world via the USB port 16. In this exemplary embodiment, as shown in FIG. 1, the test system 10 includes a test device 12 and a test control module 18.

The test control module 18 is, preferably, implemented using software. Generally, the test control module 18 resides on the computer 14. The test control module 18 controls the testing process and interacts with the test device 12 and the USB host controller 24 to determine whether the USB port 16 and the USB host controller 24 are functioning properly. The testing process and the interaction between the test device 12 and the test control module 18 will be described in further detail below.

The test device 12 further includes a device controller 20 and a test response module 22. The device controller 20 is responsible for performing standardized USB functions including, for example, handling the exchange of USB signals between the USB port 16 and the test device 12 and monitoring the accuracy of the USB signals. In one embodiment, the test device 12 is implemented using two discrete IC chips, namely, a USB controller which handles the exchange of USB signals and acts as the device controller 20 and a microcontroller which acts as the test response module 22. In an alternative embodiment, the two discrete IC chips may be combined into a single chip which is capable performing the same functions. It should be understood that a person with ordinary skill in the art will know of other ways to implement the functionality of the test device 12 using one or more IC chips.

Furthermore, the test device 12 optionally includes a number of external signals (not shown), such as LEDs, which are used to indicate the results of the test. A person of ordinary skill in the art will know of ways and methods to implement such external signals.

In another exemplary embodiment, the test device 12 includes a port which is capable of receiving a USB cable. The purpose of having this port on the test device 12 will be explained below.

In an exemplary embodiment, the test response module 22 is implemented using software or firmware. As will be described in further detail below in connection with the testing process, the test response module 22 responds to the test control module 18 and provides certain requested information from the device controller 20 to the test control module 18. Based on the requested information, the test control module 18 determines whether the USB port 16 is functioning properly.

The computer 14 includes the USB port 16. However, it should be understood that the computer 14 can contain any number of ports. In a specific embodiment, each port has four USB standard wires including: a differential data signal pair marked D+ and D−, and a +5 volt power wire, and a ground wire.

A single test device 12 can be used to test one USB port 16 of the computer 14 at a time, or multiple test devices can be placed in multiple or all USB ports at the same time. Additionally, ports of a USB hub can be tested by attaching the hub to the computer 14 and attaching the test device 12 to the ports of the hub. As shown in FIG. 1, during operation, the test device 12 is directly connected to the computer 14 through the USB port 16.

During operation, the test control module 18 residing on the computer 14 initiates the testing process by sending signals to the test device 12 connected to the USB port 16. The test device 12 via the test response module 22 responds to the test control module 18. More specifically, the test response module 22 collects certain diagnostic information from the device controller 20 and forwards such information back to the test control module 18. The test control module 18 then accordingly analyzes the received information and determines whether the USB port 16 is functioning properly. Preferably, the results of the determination are relayed to the test response module 22 which, in turn, activates the appropriate external signals. The testing process and the interaction between the test control module 18 and the test response module 22 will be more fully described below.

Figure 2:
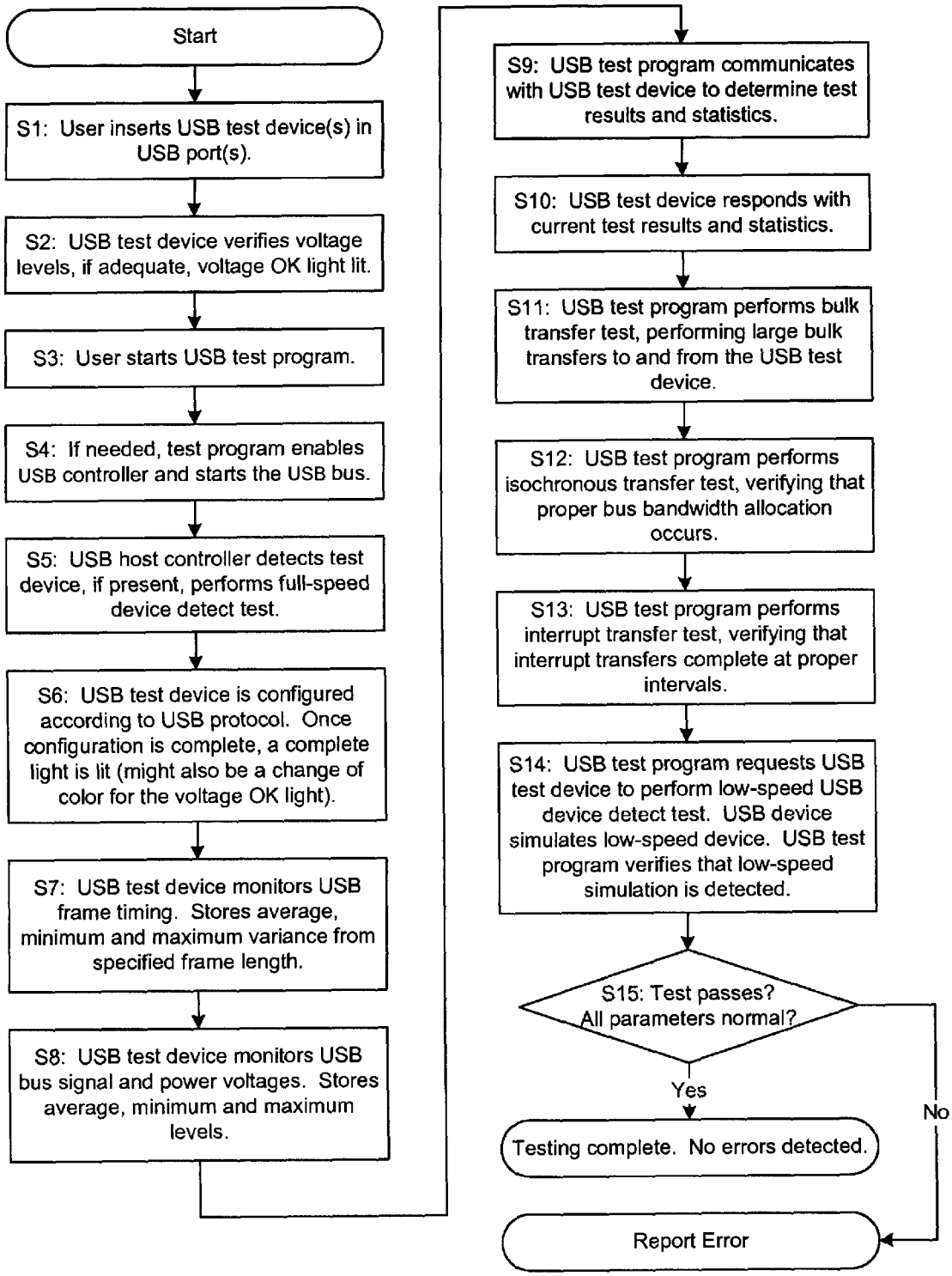
FIG. 2 is a flow diagram illustrating the testing process in accordance with one embodiment of the present invention.

FIG. 2 is a flow diagram illustrating the testing process in accordance with one embodiment of the present invention. According to this exemplary embodiment, at S1, a user connects the test device 12 to the USB port 16 of the computer 14.

Once connected, at S2, the test device 12 performs a self-test on the voltage level(s) of the USB port 16 to ensure that the USB port 16 is operational. More specifically, the test response module 22 checks the voltage level(s) of the USB port 16 to determine if they are within USB specification. For example, the test response module 22 can check if the power wire voltage level of the USB port 16 is +5 volts, which is the proper voltage according to current USB specification. Also, a minimum, maximum, or range of values can be checked. For example, the range between a +4.4 volt minimum and a +5.25 volt maximum can be deemed proper. The specific acceptable values are defined by the USB specification.

The test response module 22 then conveys the results of the check to the user. For example, once the voltage level(s) is determined to be adequate, the appropriate external signal on the test device 12 is caused to illuminate to indicate that the voltage level(s) of the USB port 16 is adequate.

Alternatively, voltage from the USB port 16 can be used directly to illuminate a signal light on the test device 12. If the signal light fails to illuminate, then it is an indication that the voltage level provided by the USB port 16 is not acceptable.

It should be understood that while the voltage level test is described herein as self-initiated by the test response module 22 after the test device 12 is plugged into the USB port 16, this test can be alternatively initiated by the test control module 18.

At S3, the user via the test control module 18 starts a series of tests to check the USB port 16. At S4, if needed, the test control module 18 enables the test device 12 and the USB host controller 24 and the USB port 16. The USB host controller 24 and the USB port 16 may need to be enabled because not all operating systems include support for the USB protocol. Any operating system that does not support the USB protocol requires the use of special software, which is included as part of the test control module 18, to enable the USB host controller 24. An example where the test control module 18 does not need to enable the USB host controller 24 and the USB port 16 is when an operating system already contains the proper bus drivers which support the USB protocol, such as in a Windows 98 environment. An example of an operating system where a USB protocol may not be supported is DOS. In enabling the USB host controller 24 and the USB port 16, the test control module 18 generally installs certain drivers to enable the USB host controller 24 and the USB port 16.

At S5, the USB host controller 24 detects whether the test device 12 is present for communication. The way the USB host controller 24 accomplishes this task is commonly understood under the USB specification. If the test device 12 is not detected by the USB host controller 24, the USB host controller 24 accordingly informs the test control module 18 which, in turn, informs the user that the test device 12 is absent. Testing of the USB host controller 24 and the USB port 16 is then halted.

When the test device 12 is detected by the USB host controller 24, the USB host controller 24 informs the test control module 18 of the presence of the test device 12. The test control module 18 then performs a full-speed device detect test to verify whether the test device 12 is a full-speed device in accordance with the USB specification. Ways to contact the full-speed device detect test are commonly understood under the USB specification.

At S6, the test device 12 is configured according to the USB protocol. This configuration step is performed because the USB protocol allows a USB-enabled device to assume one of many configurations. In configuring the test device 12, the operating system or test control module 18 (hereinafter "host") sends a query packet to the test device 12 asking what configurations are available on the test device 12. If the test control module 18 is unable to receive the configuration information from the test device 12, then the test control module 15 informs the user and accordingly halts the testing process.

Otherwise, in response to the query packet, the test device 12 sends a response packet containing the available configurations to the host. The available configurations are then displayed to the user for selection if necessary. The host then selects the desired configuration. Upon selecting a particular configuration, the appropriate device drivers for use with the selected configuration are then loaded by the host. The host also informs the test device 12 which configuration has been selected. The test device 12 is then accordingly configured. The user is then signaled when the configuration is complete. In a specific embodiment, a configuration complete light on the test device 12 can be lit or can change to a different color from the existing color. Additionally, a ringing sound or message can be used.

After configuration, at S7, the USB frame timing is monitored. More specifically, the USB frame timing between the test device 12 and the test control module 18 is monitored by the test response module 22. The USB frame timing is a measure of the amount of time between two successive frame starts. For example, a standard may be the USB specification of 1.000 milliseconds per frame, with an accuracy of better than ±500 nanoseconds. The test device 12 measures the length of a frame by monitoring the amount of time between two successive frame starts. The average, minimum, and maximum frame times are also measured. These measurements are made by the test response module 22. The frame timing measurements are then stored in the test device 12, more specifically, in the test response module 22. For example, it can be measured that frame timings are 0.996, 1.004 and 1.000 in successive frames. Thus, the minimum value stored would be 0.996, the maximum 1.004, and the average 1.000.

At S8, the test device 12 also monitors the quality of the bus signal and power voltages. More specifically, the monitoring is performed by the test response module 22. Information on the quality of the bus signal and power voltages is monitored to ensure that the data transmitted over the USB port 16 are correctly represented. For example, bus signaling for a high signal may need to exceed a certain threshold voltage level and a low signal may need to stay below another threshold voltage level. Also, the power wire may need to provide at least a specific level of voltage. The specific voltage levels may differ, based on the version of the USB specification. For USB v.1.1, the nominal voltage levels are +3.3V for a high and 0V for a low on the USB D+ and D− differential data wires, and +5V for the power wire. The USB v.1.1 specification also allows for a variance from these levels to a minimum of +2.0V and a maximum of +3.6V for a high and a minimum of 0V and a maximum of +0.8V for a low on the D+ and D− signal lines, and a minimum of +4.4V and a maximum of +5.25V on the power wire. In addition, the differential between the D+ and D− lines must be at most 200 mV. The differential voltage is calculated by subtracting the measured D− from D+0 and comparing the results thus calculated for when the bus is signaling a bus logic 0 or a bus logic 1. Note that USB uses NRZI encoding for data transmission, thus a logic 0 and logic 1 on the bus do not necessarily mean that the data bit that is transmitted is a 0 or 1 respectively.

Information relating to the average, minimum, and maximum levels of the bus signal and power voltages are then stored in the test device 12. Preferably, three values for the power voltages and three values for the bus signal are stored. These values will then be analyzed by the test control module 18 as will be described below.

At S9, the test control module 18 communicates with the test response module 22 to request the test results and statistics from the prior steps. In this step, the test control module 18 reads the test results from a results buffer of the test response module 22. In a typical implementation, a USB "pipe" which can be read using standard USB commands is used, and the result of the read is a data structure that contains the test results.

At S10, the test response module 22 receives the request and then responds with the requested test results and statistics in a binary structure. The response structure containing the test results and measured statistics is then received by the test control module 18 for analysis. Failure conditions are detected if a measured value returned in the response structure is out of acceptable tolerances. The acceptable tolerances are set forth under the USB specification. For example, a frame timing may be too slow or too fast, or a certain voltage level may be too high or too low. The user, via the test control module 18, may further adjust the acceptable tolerances to be more stringent than those set by the USB specification.

At S11, the test control module 18 causes a bulk transfer test to be performed. The purpose of the bulk transfer test is to verify that data is sent and received without errors. Bulk transfers are checked for errors. Any transmission errors or errors in the content of data packets that are sent are then detected. An example of a bulk transfer is transfer of data from a floppy drive to a USB-enabled device where premium is placed on the accuracy of the transferred data and timing of the transfer is of less importance.

More specifically, the bulk transfer test is performed by the test control module 18 by sending data to the test device 12. This data is initially placed in a buffer by the test device 12. The buffered data is then read by the test control module 18 using bulk data transfers from the test device 12 to the test control module 18. After the test control module 18 receives the data from the test device 12, the test control module 18 compares the received data to the data that it previously sent. If the two sets of data match, the error-corrected USB transfer was successful. This test may be repeated with various data, with varying lengths of different sequences of numbers that are selected specifically to create worst-case electric noise and transfer scenarios for the USB host controller 24 and the USB cable. The USB specification v.1.1 defines four data payload sizes that can be used for bulk transfers: 8, 16, 32 and 64 bytes. Future USB specifications may add other bulk transfer sizes.

Bulk data transfers are error-checked by the test device 12 and the USB host controller 24 in cooperation with the test response module 22 and the test control module 18 respectively. Bulk transfers will be retried automatically, if the data payload is determined to be in error. For example, an error condition is the repeated failure of a bulk data transmission beyond a reasonable limit established by the user via the test control module 18; another error condition is a data error that was not detected by the USB host controller 24.

At S12, the test control module 18 further causes an isochronous transfer test to be performed. The purpose of the test is to ensure that high volume constant-rate data is transmitted properly and accurately over the USB port 16. More specifically, the isochronous transfer test is conducted by performing continuous transfers to and from the test device 12. The isochronous transfer test first allocates an isochronous transfer bandwidth allocation from the USB host controller 24. By allocating bandwidth for this isochronous transfer, the test device 12 is guaranteed the requested amount of USB bus bandwidth as part of each USB frame. Then, the test device 12 begins sending a maximum amount of isochronous data in an attempt to determine whether the USB host controller 24 properly handles a device that uses up the entire slice of USB frame time given to it. Data is sent using the maximum isochronous data payload size, which is 1023 bytes. The test is repeated in both directions, with both the test control module 18 transmitting data to the test device 12, and with the test device 12 transmitting data to the test control module 18.

The success of the isochronous transfers is then verified by the test control module 18 and test response module 22 respectively. The test control module 18 and the test response module 22 verify that the isochronous transfer has occurred at the correct time and that such transfer is completed. Isochronous transfers are expected to be performed by the USB host controller 24 after all non-isochronous data that is to be sent in a USB frame has been processed, or when only enough time remains in the current USB frame to send the allocated amount of isochronous data. Both the test control module 18 and the test response module 22 verify if isochronous transfers are made at the appropriate time.

It should be noted that isochronous transfers are not error-corrected and incorrect data transmission is not considered an error condition. Error conditions, for example, include a failure to begin the isochronous transfer with sufficient time for such transfer to complete before a USB frame ends, or a failure of the USB host controller 24 to send or receive all data in the isochronous data packet. This test may be repeated at various isochronous transfer data payload sizes. Payload size is allowed to range from 1 to 1023 bytes according to the USB 1.1 specification.

At S12, the test control module 18 causes an interrupt transfer test to be performed. The purpose of the test is to verify that interrupt transfers are completed at proper intervals. Interrupt transfer is a mechanism by which the USB host controller 24 can be directed to perform infrequent transmissions of low-volume data with a guaranteed interval between transmissions. Interrupt transfers are used to transmit 1, 2, 4, 8, 16, 32 or 64 bytes of data at a time. Such transfers are suited for applications such as USB keyboards, where the USB keyboard needs to be polled frequently for new keys that may have been pressed or released. The USB specification allows a USB device to define the frequency at which a USB interrupt transfer is initiated by the USB host controller 24. The initiation of this interrupt transfer is maintained by either the USB host controller 24 or the USB device driver, or a combination of both.

To test the interrupt transfer initiation feature of the USB host controller 24, the test control module 18 requests varying intervals for the initiation of the interrupt transfers, and the test device 12 monitors and reports the interval at which the interrupt transfers are sent. If the value that is requested from the USB device driver or the USB host controller 24 does not match the frame interval that is observed by the test device 12, then an error has occurred. This check can either by hardware or O/S-dependent, depending on the operating system and the hardware configuration. The USB specification v.1.1 allows the interval between two interrupt transfers to be 1 to 255 milliseconds.

During the interrupt transfer test, the test control module 18 first sends a message to the test response module 22 instructing it how much interrupt payload data it should send to the USB host controller 24 when it receives an interrupt transfer frame. This payload data size can be 1, 2, 4, 8, 16, 32 or 64 bytes, according to USB specification v.1.1, and other values may be available in other USB specifications. Then, the test control module 18 instructs the USB host controller 24 to start interrupt transfers at specific intervals. The test response module 22 responds to these interrupt transfers by sending a response that uses the selected data payload size. The data that is sent in the data payload contains a sequence number that is maintained by the test response module 22. Based on the received interrupt data payloads, the test control module 18 then verifies that all interrupt transfers were completed at proper intervals in the proper sequence. Possible error conditions are failure to receive interrupt transfer data, missing interrupt transfer data, incorrect sequence for interrupt transfer data, incorrect interval between interrupt transfers and corrupted interrupt transfer data.

At S14, the test control module 18 causes a low-speed device detect test to be performed. The purpose of the test is to ensure that a low-speed device can be detected over the USB port 16. USB devices can either operate at full speed, 12 megabits per second, or low speed, around 1–1.5 megabits per second. However, it is contemplated that USB devices can also operate at speeds other than full and low. The full and low speed detect test is accomplished by including a programmable resistor in the test device 12 that can be programmed to be a pull-up on either the D+ or D− signal wire. For a low speed test, the programmable resistor is changed from a pull-up resistor on the D+ signal wire to a pull-up on the D− signal wire. The test control module 18 then determines if the test device 12 appears to the USB host controller 24 as a low-speed device. Possible error conditions include failure of the USB host controller 24 to detect the signaling for a low-speed device. In the future, there may be additional modes that can be tested.

At S15, once all the tests have been performed in accordance with the prior steps, the test control module 18 reviews all the test results and statistics and then determines whether all the tests have been passed. If so, the testing is complete and a user is informed that the USB port 16 is functioning properly. In a specific embodiment, a "no errors" light can be lit to provide visual indication that the USB port 16 is functioning properly. Optionally, a bell may sound or a message may be sent to the user.

A S16, if errors are detected, the errors are reported to the user. In a specific embodiment, errors can be sent in a file, displayed on a screen, or an error-detected light may be illuminated. Additionally, a statistical analysis of all tests done may be outputted to the user regardless of whether there were errors or not.

In another exemplary embodiment, as described above, the test device 12 includes a port capable of receiving a USB cable. In an alternative testing configuration, the test device 12 is used to test a USB cable. The test device 12 is connected via the port to a previously determined working USB cable which, in turn, is connected to the USB port 16. The USB port 16 is then tested using the series of tests as described above. Once it is confirmed that the USB port 16 is functioning properly, the previously determined working USB cable is replaced with a USB cable which is to be tested. The test control module 18 then initiates the series of tests as described above. If any of the tests fails, then it is an indication that the tested USB cable is not functioning properly.

The above description is illustrative and not restrictive. Many variations of the invention will become apparent to those of skill in the art upon review of this disclosure. The scope of the invention should, therefore, be determined not with reference to the above description but instead should be determined with reference to the appended claims along with their scope of equivalents.

What is claimed is:

1. A system for testing a host computing device having a universal serial bus host controller and a serial bus port, comprising:

a test control module residing on said host computing device, *the test control module comprising software to enable at least one of the universal serial bus host controller and the serial bus port*; and a test device coupled to said universal serial bus host controller via said universal serial bus port;

wherein said test control module communicates with said test device in order to perform a series of tests on said universal serial bus host controller and said universal serial bus port, *wherein the series of tests includes at least one test selected from the group: a voltage level test, a full-speed device detect test, a frame timing check, a bus signal and power voltage test, a bulk transfer test, an isochronous transfer test, an interrupt transfer test, and a low-speed device detect test.*

2. The system according to claim 1, wherein said series of tests includes a voltage level test.

3. The system according to claim 1, wherein said series of tests include a full-speed device detect test.

4. The system according to claim 1, wherein said series of tests includes a frame timing check.

5. The system according to claim 1, wherein said series of tests includes a bus signal and power voltage test.

6. The system according to claim 1, wherein said series of tests includes a bulk transfer test.

7. The system according to claim 1, wherein said series of tests includes an isochronous transfer test.

8. The system according to claim 1, wherein said series of tests includes an interrupt transfer test.

9. The system according to claim 3, wherein said series of tests includes a low-speed device detect test.

10. A system for testing a host computing device having a universal serial bus port, comprising:

a test device coupled to said universal serial bus port, said test device further includes a device controller and a test response module;

a test control module configured to communicate with said test response module in order to conduct a series of tests to test said universal serial bus port, *the test control module further configured to install one or more drivers to enable at least one of a universal serial bus host controller and the universal serial bus port*;

wherein said series of tests includes a voltage level test, a frame timing check, and a bus signal and power voltage test.

11. The system according to claim 10, wherein said series of tests further includes a full-speed device detect test, a bulk transfer test, an isochronous transfer test, an interrupt transfer test, and a low-speed device detect test.

12. The system according to claim 10, wherein said test response module in response to instructions received from said test control module causes said device controller to provide information in accordance with a specific test; and wherein said information is forwarded to said test control module to allow said test control module to determine whether said universal serial bus port is functioning properly.

13. A method for testing a host computing device having a universal serial bus port [and a universal serial bus cable] using a test device and a test control module, comprising:

*enabling the universal serial bus port using software from a source other than an operating system running on the host computing device;* connecting said test device to said universal serial bus port;

initializing said test device;

causing said test device to provide information for a series of tests in response to instructions received from said test control module, *wherein the series of tests includes at least one test selected from the group: a voltage level test, a full-speed device detect test, a frame timing check, a bus signal and power voltage test, a bulk transfer test, an isochronous transfer test, an interrupt transfer test, and a low-speed device detect test*;

communicating said information to said test control module; and causing said test control module to analyze said information to determine whether said universal serial bus port is functioning properly.

14. The method of claim 13, wherein said series of tests includes a voltage level test, a frame timing check, and a bus signal and power voltage test.

15. The method of claim 14, wherein said series of tests further includes a full-speed device detect test, a bulk transfer test, an isochronous transfer test, an interrupt transfer test, and a low-speed device detect test.

16. The method of claim 13, wherein initializing said test device comprises configuring said test device according to a USB protocol.

17. The method of claim 13, wherein communicating said information to said test control module comprises:

sending a request for said information in a control packet to said test device; and sending said information in a response packet from said test device to said test control module.

18. The method of claim 13, further comprising:

upon confirming that said universal serial bus port is functioning properly, connecting [said] *a* universal serial bus cable between said test device and said universal serial bus port;

causing said test device to provide information for said series of tests in response to instructions received from said test control module;

communicating said information to said test control module; and causing said test control module to analyze said information to determine whether said universal serial bus cable is functioning properly.

*19. The system of claim 1, wherein the test control module is configured to be executed in an operating system that does not support a USB protocol.*

*20. The system of claim 19, wherein the test control module is configured to be executed in DOS.*

*21. The system of claim 10, wherein the test control module is configured to be executed in an operating system that does not support a USB protocol.*

*22. The system of claim 21, wherein the test control module is configured to be executed in DOS.*

*23. A computer program product for testing at least one of a universal serial bus host controller and a universal serial bus port of a host computing device, the computer program product comprising a computer-readable medium containing computer program code for performing the steps:*

*enabling at least one of the universal serial bus port and the universal serial bus controller of the host computing device using software from a source other than an operating system running on the host computing device;*

*communicating information with a test device coupled to the universal serial bus host controller via the universal serial bus port; and*

*testing at least one of the universal serial bus port and the universal serial bus controller of the host computing device by analyzing the information communicated with the test device.*

*24. The computer program product of claim 23, wherein the computer program product is configured to be executed in an operating system that does not support a USB protocol.*

*25. The computer program product of claim 24, wherein the computer program product is configured to be executed in DOS.*

*26. A system for testing a host computing device having a universal serial bus host controller and a serial bus port, comprising:*

*a test control module residing on the host computing device; and*

*a test device coupled to the universal serial bus host controller via the universal serial bus port;*

*wherein the test control module communicates with the test device in order to perform a series of tests on the universal serial bus host controller and the universal serial bus port, and wherein the test device is configured to be directly connected without a cable to the universal serial bus port during the tests.*

*27. A method for testing a host computing device having a universal serial bus port using a test device and a test control module, comprising:*

*connecting the test device directly to the universal serial bus port without a cable;*

*initializing the test device;*

*causing the test device to provide information for a series of tests in response to instructions received from the test control module;*

*communicating the information to the test control module; and*

*causing the test control module to analyze the information to determine whether the universal serial bus port is functioning properly.*

* * * * *